(12) United States Patent
Schoenherr et al.

(10) Patent No.: US 10,170,739 B2
(45) Date of Patent: Jan. 1, 2019

(54) PIN MOUNT FOR BATTERY MODULE

(71) Applicants: Bosch Battery Systems GmbH, Stuttgart (DE); Robert Bosch GmbH, Stuttgart (DE)

(72) Inventors: Robert Schoenherr, Oxford, MI (US); Mehul Botadra, Sterling Heights, MI (US)

(73) Assignees: Bosch Battery Systems GmbH, Stuttgart (DE); Robert Bosch GmbH, Stuttgart (DE)

( * ) Notice: Subject to any disclaimer, the term of this patent is extended or adjusted under 35 U.S.C. 154(b) by 175 days.

(21) Appl. No.: 14/924,053

(22) Filed: Oct. 27, 2015

(65) Prior Publication Data

US 2017/0117519 A1 Apr. 27, 2017

(51) Int. Cl.
*H01M 2/10* (2006.01)

(52) U.S. Cl.
CPC .......... *H01M 2/1072* (2013.01); *H01M 2/10* (2013.01); *H01M 2/1016* (2013.01); *H01M 2/1061* (2013.01); *H01M 2/1077* (2013.01); *H01M 2220/20* (2013.01)

(58) Field of Classification Search
CPC .... H01M 2/1077; H01M 2/1061; H01M 2/10; H01M 2220/20; H01M 2/1072; H01M 2/1016
See application file for complete search history.

(56) References Cited

U.S. PATENT DOCUMENTS 2,397,290 A * 3/1946 Rasmussen ............ H01B 17/26
277/606

5,378,057 A 1/1995 Bach et al.
6,379,837 B1 4/2002 Takahashi et al.
6,465,123 B1 10/2002 Baumann et al.
(Continued)

FOREIGN PATENT DOCUMENTS

JP 2012009310 * 1/2012 .............. H01M 2/10

OTHER PUBLICATIONS

English Machine translation and JPO Abstract, JP 2012009310, Jan. 2012.*

*Primary Examiner* — Jonathan G Leong
*Assistant Examiner* — Aaron J Greso
(74) *Attorney, Agent, or Firm* — Kelly McGlashen; Maginot Moore & Beck LLP

(57) ABSTRACT

A battery pack housing forms a container that receives battery modules. The battery pack housing includes container portion and a cover that closes an open end of the container portion. The container portion includes a base, sidewalls that surround the base, and parallel rails that protrude from the base inner surface. The rails have longitudinally-spaced slots that open facing the cover. In addition, an inner surface of the cover portion includes parallel rails having longitudinally spaced slots that open facing the base. The slots are configured to receive and retain pins provided on side surfaces of the battery module housing. The cooperation between the pins of the battery module housing and the slots of the container portion and cover portion permit modules to be easily and securely located within the battery pack housing, and to be quickly removed from the battery pack housing during maintenance.

10 Claims, 6 Drawing Sheets

(56) References Cited

U.S. PATENT DOCUMENTS

| | | |
|---|---|---|
| 7,128,999 B1 | 10/2006 | Martin et al. |
| 7,919,203 B2 | 4/2011 | Shibuya et al. |
| 8,557,436 B2 | 10/2013 | Schwab |
| 2003/0003350 A1 | 1/2003 | Heimer et al. |
| 2007/0278915 A1* | 12/2007 | Conrardy ............ H01M 2/1077 312/257.1 |
| 2009/0155675 A1 | 6/2009 | Houchin-Miller |
| 2012/0301765 A1 | 11/2012 | Loo et al. |
| 2013/0280565 A1 | 10/2013 | Lee et al. |
| 2014/0120407 A1* | 5/2014 | Hofer .................... H01M 2/206 429/159 |

* cited by examiner

PIN MOUNT FOR BATTERY MODULE

BACKGROUND

1. Field of the Invention

The present invention relates a battery pack assembly including structures for locating and securely retaining a battery module within a battery pack housing, and, more particularly, to complimentary structures formed on the battery pack housing and battery module that locate the battery module relative to the battery pack housing, and permit quick connection and disconnection of the battery module from the battery pack housing.

2. Description of the Related Art

Battery packs provide power for various technologies ranging from portable electronics to renewable power systems and environmentally friendly vehicles. For example, hybrid electric vehicles (HEV) use a battery pack and an electric motor in conjunction with a combustion engine to increase fuel efficiency. Battery packs are formed of a plurality of battery modules, where each battery module includes several electrochemical cells. The cells are arranged in stacks and are electrically connected in series or in parallel. Likewise, the battery modules within a battery pack are electrically connected in series or in parallel. In some conventional battery packs, the battery modules are installed and retained within the battery pack housing using bolts to locate the battery module relative to the housing and nuts to retain the battery module on the bolts. In some conventional battery packs, holes of the battery module are aligned with corresponding holes of the battery pack housing, and a fastener is passed through the holes and retained using a nut. These methods are difficult to use due to space constraints within the battery pack housing which also lead to difficulty visualizing the holes and fasteners. In addition, use of nut and bolt fasteners is labor intensive and time consuming.

SUMMARY

In some aspects, a battery pack includes a battery pack housing and a battery module disposed in the battery pack housing. The battery pack housing includes a first side, and a second side that is parallel to the first side, where an inner surface of the first side faces and is spaced apart from an inner surface of the second side. The battery pack housing includes a first rail that protrudes from the inner surface of the first side, the first rail including a first surface feature. The battery pack housing also includes a second rail that protrudes from the inner surface of the second side, the second rail including a second surface feature. The battery module is disposed in the battery pack housing so as to reside between the first side and the second side. The battery module includes a module housing, and an outer surface of the module housing includes a third surface feature and a fourth surface feature. The battery module also includes electrochemical cells disposed within the module housing. The first surface feature and the second surface feature comprise one of a protrusion and a slot, the third surface feature and the fourth surface feature comprise the other of the protrusion and the slot, and the slot is shaped and dimensioned to receive and support the protrusion. In addition, the protrusion is disposed in the slot, and the module housing is located and retained relative to the battery pack housing via engagement of the first surface feature with the third surface feature, and engagement of the second surface feature with the fourth surface feature.

The battery pack may include one or more of the following features: The first surface feature and the second surface feature are aligned in a direction perpendicular to the inner surface of the first side. The first surface feature is a first slot that opens facing the inner surface of the second side, and the second surface feature is a second slot that opens facing the inner surface of the first side. The first slot and the second slot are shaped to conform to the shape of an outer surface of the protrusion. The third surface feature is a protrusion disposed in the first slot, and the fourth surface feature is a protrusion disposed in the second slot. The first rail includes a first support surface that is parallel to and spaced apart from the inner surface of the first side, and the first slot opens at the first support surface. The second rail includes a second support surface that is parallel to and spaced apart from the inner surface of the second side, and the second slot opens at the second support surface. The first slot intersects the first support surface and adjoining side surfaces of the first rail, the adjoining side surfaces extending between the inner surface of the first side and the first support surface. The first slot includes a seat portion and a chamfered guide portion that is disposed between the seat portion and the first support surface. The guide portion is chamfered so as to have a maximum spacing between facing slot surfaces at a location corresponding the intersection of the chamfered portion and the first support surface, and a minimum spacing between facing slot surfaces at a location corresponding to the intersection of the chamfered portion and the seating portion. The seating portion is shaped to conform to the shape of an outer surface of the pin. The module housing includes a module first side that is transverse to the battery pack housing first side, and a module second side opposed to the module first side, and the third surface feature is formed on the module first side and the fourth surface feature is formed on the module second side. The battery pack housing first side includes plural parallel and spaced apart first rails, each first rail including a first surface feature, and the battery pack housing second side includes plural second rails, each second rail aligned with one of said first rails. The battery pack housing includes a detachable cover that includes the first side, and a container portion that includes the second side, and the cover is configured to be supported on the container portion to form a hollow container. The battery pack housing includes a third rail that protrudes from the inner surface of the first side and is spaced apart from the first rail, a fourth rail that protrudes from the inner surface of the second side and is spaced apart from the second rail, wherein the module housing is disposed between the first rail and the third rail, and between the second rail and the fourth rail.

In some aspects, a housing includes an outer housing and an inner housing disposed in the outer housing. The outer housing includes a first side, and a second side that is parallel to the first side, an inner surface of the first side facing and being spaced apart from an inner surface of the second side. The outer housing includes a first rail that protrudes from the inner surface of the first side, the first rail including a first surface feature. The outer housing also includes a second rail that protrudes from the inner surface of the second side, the second rail including a second surface feature. The inner housing is disposed in the outer housing so as to reside between the first side and the second side, and the inner housing includes a third surface feature and a fourth surface feature. The first surface feature and the second surface feature comprise one of a protrusion and a slot, the third surface feature and the fourth surface feature comprise the other of the protrusion and the slot, and the slot is shaped and dimensioned to receive and support the protrusion. In addition, the protrusion is disposed in the slot, and the inner housing is located and retained relative to the outer housing via engagement of the first surface feature with the third surface feature, and engagement of the second surface feature with the fourth surface feature.

The housing may include one or more of the following features: The first surface feature is a slot and the third surface feature is a pin. A surface of the slot is shaped to conform to the shape of an outer surface of the pin. The slot is chamfered. The outer housing includes at least two first rails and at least two second rails, each first rail being aligned with a corresponding one of the at least two second rails. Each first rail includes at least two first surface features, and each second rail includes at least two second surface features, each one of the at least two first surface feature being aligned with a corresponding one of the at least two second surface features.

In some aspects, a battery pack assembly includes structural features for locating and securely retaining a battery module within a battery pack housing. The structural features also permit the battery module to be quickly released from the battery pack housing, for example during maintenance of the battery pack. In some embodiments, the battery pack housing includes container portion and a cover that closes an open end of the container portion to form a hollow container. The container portion includes a base and sidewalls that surround the base. The container portion includes parallel rails that protrude from the base inner surface and have longitudinally-spaced slots that open facing the cover. In addition, an inner surface of the cover portion includes parallel rails having longitudinally spaced slots that open facing the base. The slots are configured to receive and retain pins provided on side surfaces of the battery module housing. The cooperation between the pins of the battery module housing and the slots of the container portion and cover portion permit modules to be easily and securely located within the battery pack housing, and to be quickly removed from the battery pack housing during maintenance.

DETAILED DESCRIPTION

Figure 1:
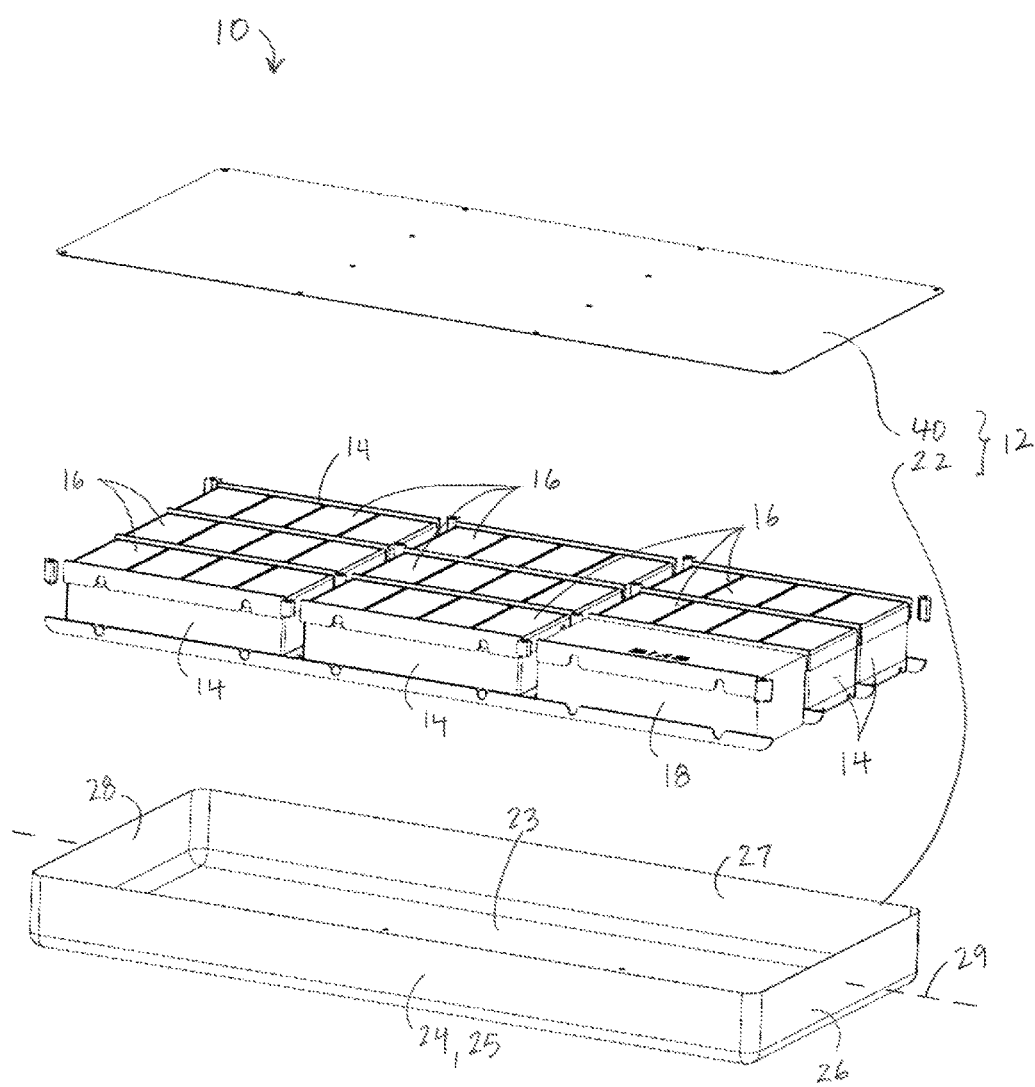
FIG. 1 is an exploded perspective schematic view of a battery pack.
Figure 2:
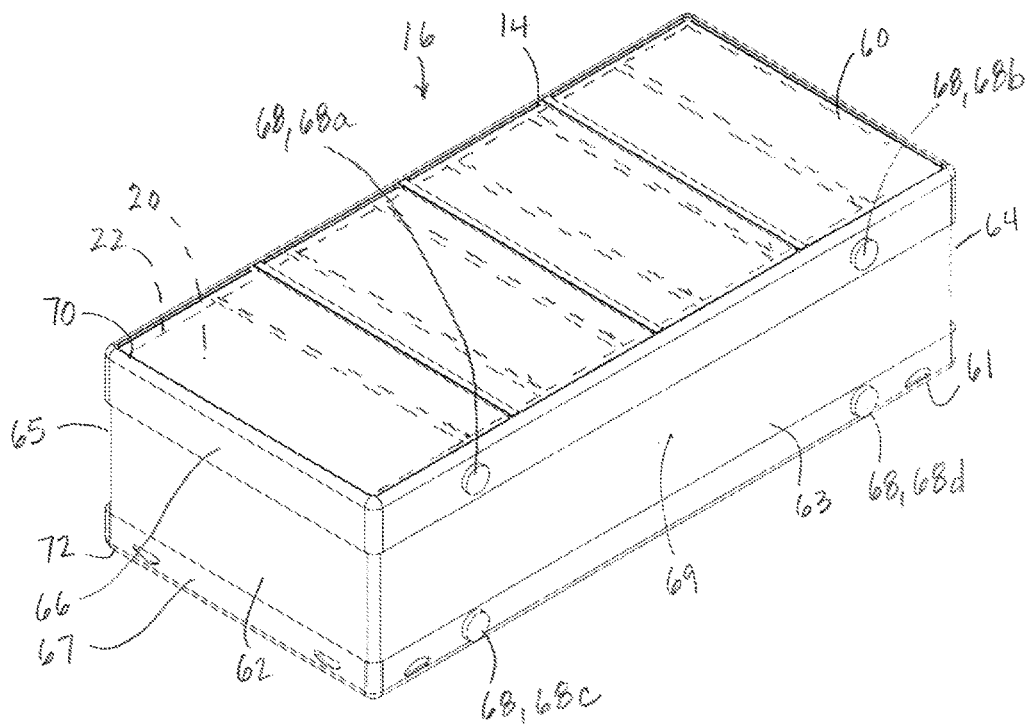
FIG. 2 is a perspective view of a battery module.

Referring to FIGS. 1 and 2, a battery pack 10 used to provide electrical power includes electrochemical cells 20 that are electrically interconnected and stored in an organized manner within a battery pack housing 12. The cells 20 are prismatic lithium-ion cells that include an electrode assembly (not shown) that is sealed within a cell housing 22 along with an electrolyte to form a power generation and storage unit. The electrode assembly may be, but is not limited to, a "jelly roll" electrode assembly that includes a positive electrode, a negative electrode and an intermediate separator provided in a stacked and rolled arrangement. An array of cells 20 are bundled together within a module housing 14 to form a battery module 16. Within the battery module 16, the array of cells 20 are electrically connected in series or in parallel, and within the battery pack housing 12, the battery modules 16 are electrically connected in series or in parallel. The battery pack housing 12 and the battery module housings 14 include structural features that cooperatively engage to permit blind installation of the battery modules 16 within the battery pack housing 12, and that securely retain the battery module housing 14 in a fixed position relative to the battery pack housing 12 once the battery pack 10 has been assembled, as discussed further below.

Figure 3:
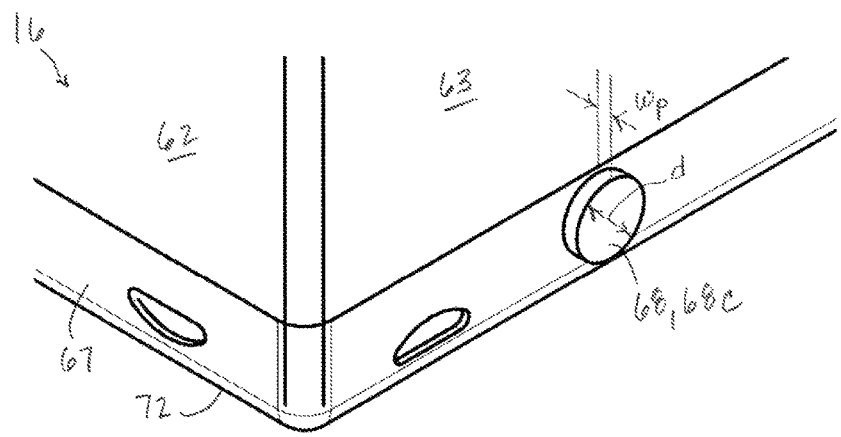
FIG. 3 is an enlarged view of a portion of the battery module of FIG. 2.

Referring to FIGS. 2 and 3, the module housing 14 of each battery module 16 has a rectangular shape and includes a first end 60, an opposed second end 61, and four sides that extend between, and join, the first end 60 to the second end 61. That is, the four sides of the module housing 14 include a first side 62, a second side 63 adjoining the first side 62, a third side 64 opposed to the first side 62, and a fourth side 65 opposed to the second side 63. For purposes of description, the distance between the first end 60 and the second end 61 corresponds to a height dimension of the module housing 14, the distance between the first side 62 and the third side 64 corresponds to a length dimension of the module housing 14, and the distance between the second side 63 and the fourth side 65 corresponds to a width dimension of the module housing 14. In the illustrated embodiment, the length of the module housing 14 is greater than its width, and the width of the module housing 14 is greater than its height.

In some embodiments, the module housing 14 may include a first restraint 66 in the form of a metal strap that is disposed adjacent the first end 60 and surrounds a circumference of the module housing 14 defined by the four sides 62, 63, 64, 65. An edge 70 of the first restraint 66 is folded over a periphery of the first end 60. In addition, the module housing 14 may include a second restraint 67 in the form of a metal strap that is disposed adjacent the second end 61 and surrounds the circumference of the module housing 14. An edge 72 of the second restraint 67 is folded over a periphery of the second end 61.

Opposed second and fourth sides 63, 65 of the module housing 14 are provided with outwardly protruding pins 68. That is, the pins 68 protrude in the width direction of the module housing 14. The pins 68 are structural features of the module housing 14 that cooperatively engage with slots 36 formed on the battery pack housing 12 to facilitate installation and retention of the module housing 14 within the battery pack housing 12. The slots 36 are described below.

The pins 68 provided on the fourth side 65 are identical to, and have the same arrangement as, the pins 68 provided on the second side 63, and thus only the pins 68 on the second side 63 will be described. Each pin 68 is circular in cross-sectional shape when viewed facing the housing side 63, and has the appearance of a thin disc. For example, the pin 68 has a width $w_p$ that is less than a diameter d of the pin cross-section, where the pin width is aligned with a width of the module housing 14. In some embodiments, the pin 68 has a width that is in a range of about 10 to 25 percent of the diameter of the pin cross section.

In the illustrated embodiment, the second module housing side 63 includes four pins as follows: The second module housing side 63 includes first pair of pins corresponding to two longitudinally spaced-apart pins 68a, 68b that protrude from the first restraint 66, and a second pair of pins corresponding to two longitudinally spaced-apart pins 68c, 68d that protrude from the second restraint 67. Of the four pins, two pins 68a, 68c are adjacent the first side 62 (e.g., closer to the first side 62 than a mid-length 69 of the module housing 14), and are aligned in the height direction. The other two pins 68b, 68d are adjacent the third side 64 (e.g., closer to the third side 64 than the mid-length 69 of the module housing 14) and are aligned in the height direction. In some embodiments, the pins 68a, 68b, 68c, 68d may be formed separately from the restraints 66, 67, and then rigidly secured thereto for example by welding or using a fastener. In other embodiments, the pins 68a, 68b, 68c, 68d are integrally formed with the restraints 66, 67, for example by molding, punching or machining.

Figure 4:
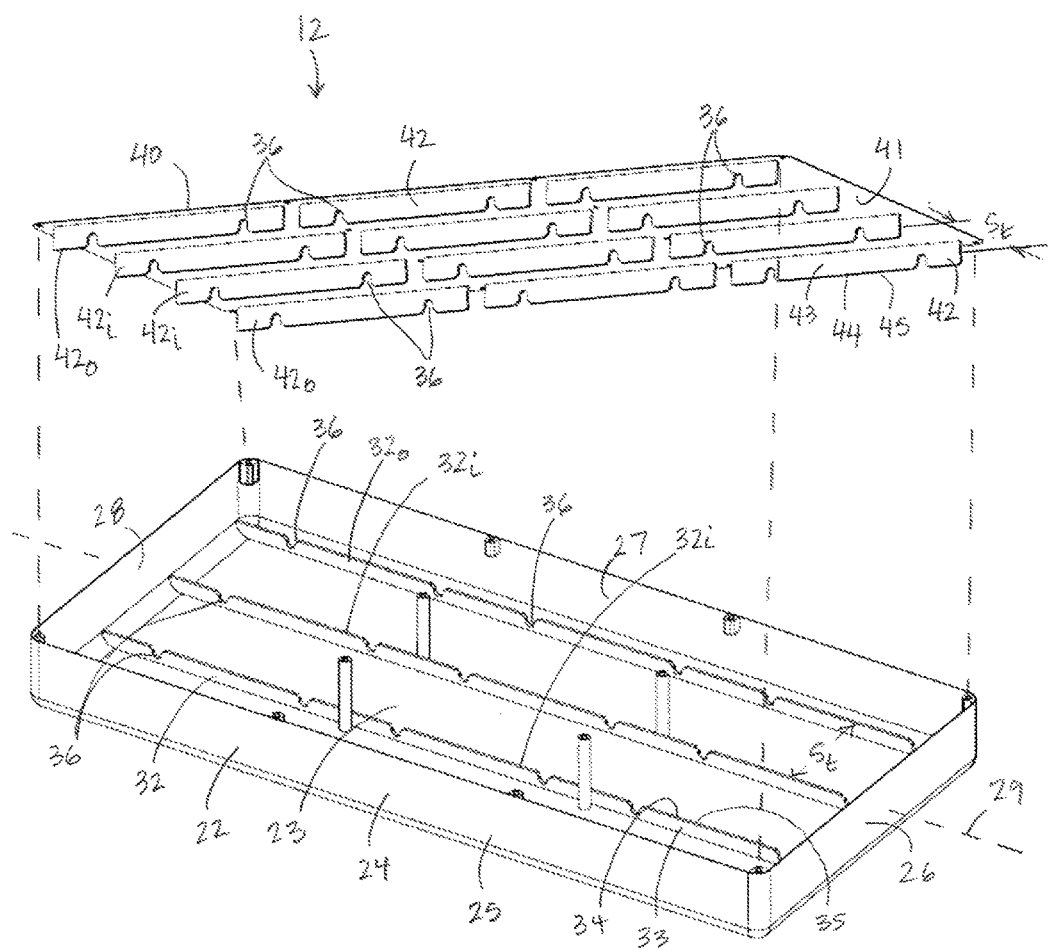
FIG. 4 is an exploded view of the battery pack housing.

Referring to FIG. 4, the battery pack housing 12 includes a container portion 22 and a cover portion 40 that covers an open end of the container portion 22. The container portion 22 has the shape of an open-ended box, and includes a rectangular base 23. A sidewall 24 is connected to and surrounds a periphery of the base 23. The sidewall 24 includes two longitudinal sidewall portions 25, 27 that are parallel to a longitudinal axis 29 of the battery pack housing 12 and define a length dimension of the battery pack housing 12. The sidewall 24 also includes two transverse sidewall portions 26, 28 that extend transverse to the longitudinal sidewall portions 25, 27 and join opposed ends of the longitudinal sidewall portions 25, 27. The transverse sidewall portions 26, 28 define a width dimension of the battery pack housing 12. A height dimension of the battery pack housing 12 corresponds to a distance between the container portion 22 and the cover portion 40 when the cover portion 40 is assembled thereon. The length dimension of the battery pack housing 12 is greater than its width dimension, and the width dimension of the battery pack housing is greater than its height dimension.

The cover portion 40 has the shape of a generally flat, rectangular plate having the same dimensions as the base 23. The cover portion 40 is formed separately from the container portion 22, and is detachably secured over the open end of the container portion 22 via conventional fastening means. For example, in the illustrated embodiment, the cover portion 40 is secured to the sidewall 24 via screws (not shown).

The container portion 22 further includes base rails 32 that protrude inward from an inner surface 31 of the base 23. In addition, the cover portion 40 includes cover rails 42 that protrude inward from an inner surface 41 of the cover portion 40. The base rails 32 and cover rails 42 are elongated, rectangular in cross-section and extend longitudinally between opposed transverse sidewall portions 26, 28. The number of base rails 32 provided corresponds to the number of cover rails 42 provided, and each base rail 32 is aligned with a corresponding one of the cover rails 42. The base rails 32 and cover rails 42 may be formed integrally with the respective container portion 22 and cover portion 40, or may be rigidly fixed thereto. Outer base rails 32o and outer cover rails 42o are provided adjoining each longitudinal sidewall portion 25, 27. Intermediate base rails 32i and intermediate cover rails 42i are disposed between the respective outer base rails 32o and outer cover rails 42o. For example, in the illustrated embodiment, two intermediate base rails 32i are disposed between the outer base rails 32o and two intermediate cover rails 42i are disposed between the outer cover rails 42o.

The transverse spacing $S_t$ between adjacent base rails 32 corresponds to a width dimension of the battery module housing 14. The transverse spacing $S_t$ between adjacent cover rails 42 is the same as the transverse spacing between adjacent base rails 32.

The base rails 32 and cover rails 42 provide structural stiffness to the container portion 22, and also include structural features (e.g., slots 36) that cooperatively engage with the pins 68 of the module housing to facilitate installation and retention of the module housing 14 within the battery pack housing 12. In particular, each base rail 32 includes a cover-facing surface 34, and adjoining side surfaces 33, 35 that extending between the inner surface 31 of the base 23 and the cover-facing surface 34. The cover-facing surface 34 of each base rail 32 is formed having the slots 36 that open facing the cover portion 40 and extend across a width (e.g., the distance between the adjoining sides surfaces 33, 35) of each base rail 32. Similarly, each cover rail 42 includes a cover-facing surface 44, and adjoining side surfaces 43, 45 that extending between the inner surface 41 of the cover 40 and the base-facing surface 44. The base-facing surface 44 of each cover rail 42 is formed having slots 36 that open facing the base 23 and extend across a width (e.g., the distance between the adjoining sides surfaces 43, 45) of each cover rail 42.

Each base rail 32 is aligned in the height direction (e.g. in a direction perpendicular to the inner surface 21 of the base 23) with a corresponding cover rail 42. In addition, each slot 36 formed in the base rail 32 is aligned in the height direction, with a corresponding slot 36 formed in cover rail 32. The slots 36 are longitudinally spaced apart. In particular, the slots 36 are formed in pairs in which the longitudinal spacing of the slots 36 of the pair corresponds to the spacing of the pins 68 on a side of the module housing 14. Longitudinal spacing between adjacent pairs of slots 36 is relatively short to provide close packing of module housings 14 within the battery pack 10.

Figure 5:
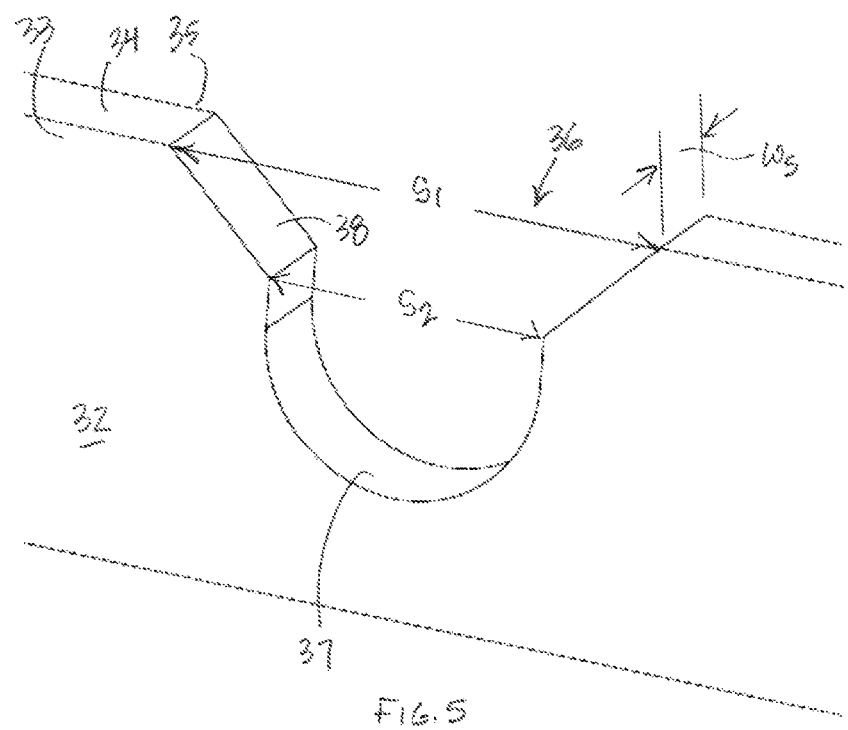
FIG. 5 is an enlarged view of a portion of a base rail illustrating details of a slot.

Referring to FIG. 5, the slots 36 formed in the base rails 32 and cover rails 42 are identical, so only the slots 36 of the base rails 32 will be described in detail. The slots 36 are shaped and dimensioned to receive and support a corresponding one of the pins 68 formed on an outer surface of the module housing 14. To that end, the slots 36 each include a seat portion 37 and a guide portion 38 that is disposed between the seat portion 37 and the corresponding base-facing, or cover-facing, surface 34, 44. The guide portion 38 is chamfered so as to have a maximum spacing $S_1$ between facing slot surfaces at a location corresponding the intersection of the guide portion 38 and the cover-facing, surface 34, and a minimum spacing $S_2$ between facing slot surfaces at a location corresponding to the intersection of the guide portion 38 and the seat portion 37. The chamfered guide portion 38 provides a lead-in that directs the pin 68 to the seat portion 37, which facilitates blind location during assembly.

In addition, the seat portion 37 is shaped and dimensioned to conform to the shape of an outer surface of the pin 68. For example, in the illustrated embodiment, the seat portion 37 is circular to correspond to the circular cross-sectional shape of the pin 68, and is sized to receive the pin 68 in a clearance fit.

In some embodiments, the seat portion 37 of each slot is provided with a compressible, resilient pad (not shown) that accommodates differences in tolerances between the seat portion 37 and the pin 68 and reduces vibration and its associated noise.

Figure 6:
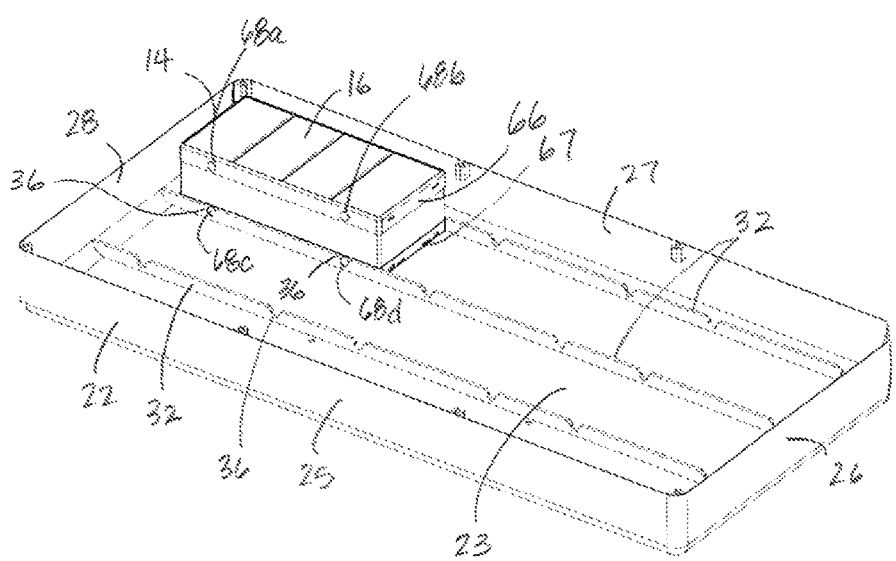
FIG. 6 is a perspective view of a module disposed in the container portion of the battery pack housing of FIG. 4.
Figure 7:
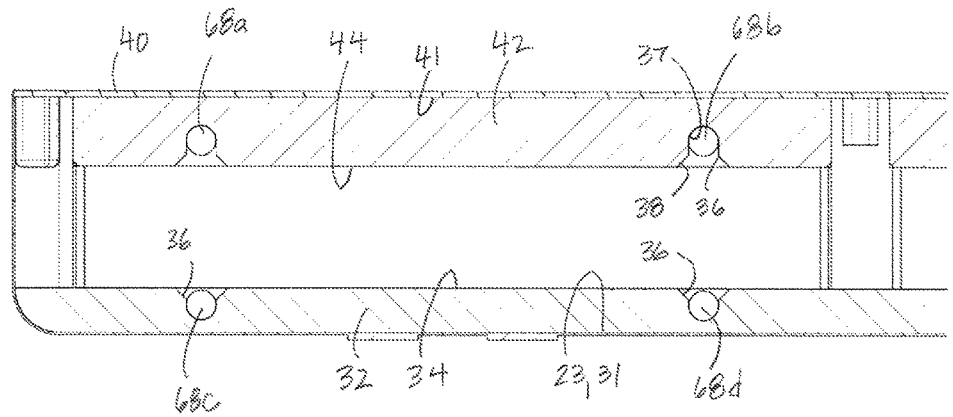
FIG. 7 is a side view of a module disposed between the cover portion and the container portion of the battery pack housing of FIG. 4.

Referring to FIGS. 1 and 6-7, in some embodiments, the battery pack housing 12 includes four base rails 32, and four cover rails 42, each cover rail 42 in alignment with one of the base rails 32. A row of battery modules 16 is supported between each pair of adjacent base rails 32, and thus three rows of battery modules 16 are supported with the battery pack housing 12. In addition, each base rail 42 and each cover rail 42 includes six slots 36 corresponding to three slot pairs. Each battery module includes the first pair of pins 68a, 68b arranged to engage a corresponding slot pair of the cover rail 42, and the second pair of pins 68c, 68d arranged to engage a corresponding slot pair of the base rail 32. Thus, each row of battery modules 16 may include up to three battery modules 16. In some embodiments, the battery module controller (BMS) 18 is disposed within the battery pack housing in the place of one of the battery modules 16, whereby the number of battery modules 16 within the battery pack 10 is reduced by one to make space for the BMS. Thus, in the illustrated embodiment, the battery pack housing contains eight battery modules 16 and the BMS.

When the battery modules 16 are disposed in the battery pack 12, and the cover portion 40 is secured to the container portion 22, each battery module 16 is placed between a pair of base rails 32 and corresponding pair of cover rails 42 such that the length dimension of the battery module is parallel to the longitudinal axis 29 of the battery pack housing 12. Since the spacing between adjacent base rails 32 and between adjacent cover rails 42 corresponds to a width of the battery module housing 14, each battery module 16 is constrained from transverse movement by the rails 32, 42. In addition, the first pair of pins 68a, 68b of the opposed sides 63, 65 of the battery module 16 are received within a corresponding pairs of slots 36 of adjacent cover rails 42, and the second pair of pins 68c, 68d of the opposed sides 63, 65 of the battery module 16 are received within a corresponding pairs of slots 36 of adjacent base rails 36, whereby each battery module 16 is constrained from both longitudinal movement and movement in the height direction.

Figure 8:
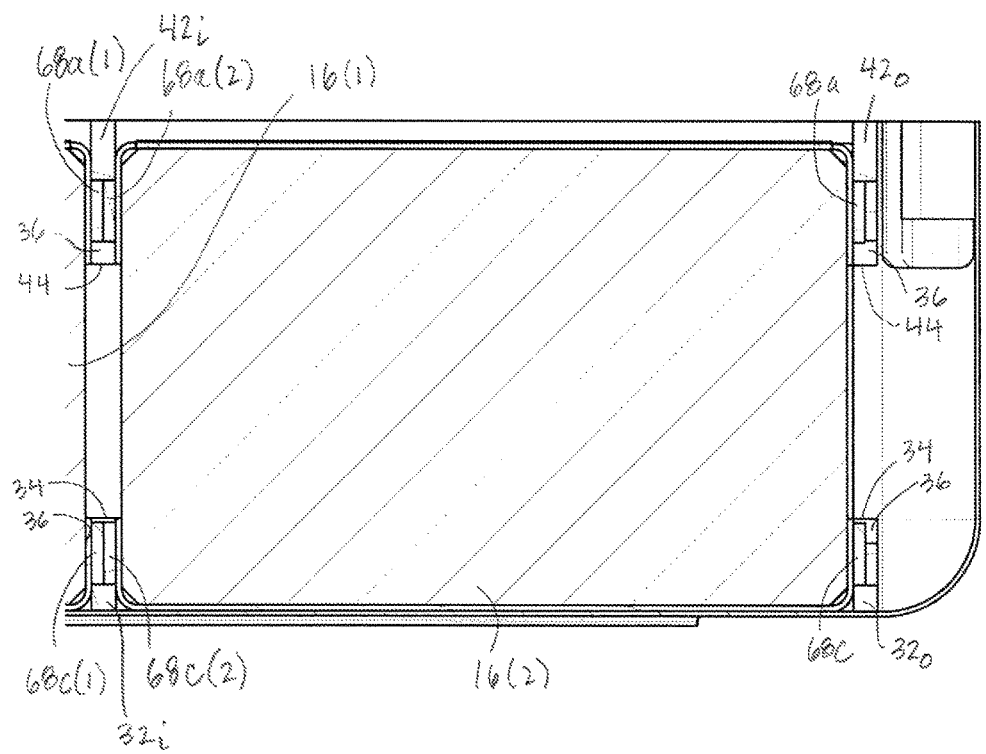
FIG. 8 is a cross sectional view of a portion of the battery pack as seen along a plane parallel to the base 23 and passing through a pair of pins disposed in a single slot.

Referring to FIG. 8, the slots 36 have a slot width $w_s$ that is sufficient to receive and support two pins 68 aligned in a transverse direction. In particular, each slot 36 can receive a first pin 68(1) from a first module 16(1) disposed along a first adjoining side surface 33 of the base rail 30, and a second pin 68(2) from a second module 16(2) disposed along a second adjoining side surface 35 of the base rail 30.

Figure 9:
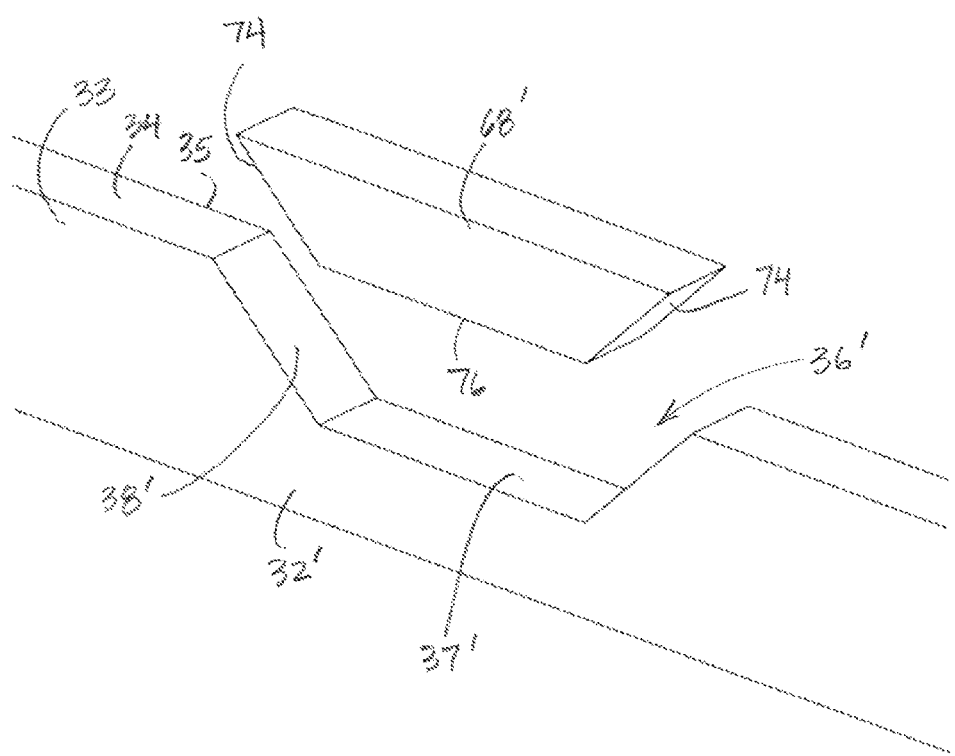
FIG. 9 is an enlarged view of a portion of a base rail illustrating details of an alternative slot.

In the illustrated embodiment, the pins 68 and the seat portion 37 of the slots 36 are formed having a circular shape. However, other the pins 68 and the slots 36 may be formed having other shapes. For example, in some embodiments and as shown in FIG. 9, an alternative slot 36' may include a chamfered guide portion 38' and a flat seat portion 37'. A corresponding alternative pin 68' may have a trapezoidal cross sectional shape, including angled sides 74 and a flat base 76, that is shaped and dimensioned to correspond to the shape of the alternative slot 36'.

In the illustrated embodiment, the cover portion 40 includes four cover rails 42 and the base 23 of the container portion 22 includes the corresponding four base rails 32. However, the number of cover rails 42 and base rails 32 is not limited to four, and can be changed to permit fewer or greater numbers of battery modules 16 to be store within the battery pack 10.

Although the battery pack 10 is described as including a set of slotted rails 32, 42 provided on the battery pack housing 12 and corresponding pins 68 provided on the battery module housing 14, an alternative embodiment is contemplated in which the battery module housing 14 is formed having slots that are configured to cooperatively engage with pins formed on the battery pack housing 12.

Although the module housing 14 is described as including restraints 66, 67, the module housing 14 is not limited to this configuration. For example, in some embodiments, the module housing 14 is formed without restraints 66, 67, and the pins 68 are formed on an outer surface of the restraint-free module housing.

Although the cells 20 that make up the battery module 16 are described herein as having a prismatic shape, the cells 20 are not limited to this shape. For example, the cells 20 may have a circular, elliptical, pouch or other shape.

Although the cells that make up the battery module 16 are described herein as being a lithium-ion cell, the cells are not limited to this type. For example, the cells 20 may be alkaline, aluminum-ion, nickel metal hydride, nickel cadmium or other type of cell.

The cooperative engagement between the pins 68 on the outer surface of the module housing 14 and the slots 36 on an inner surface of the battery pack housing 12 provide a locating and restraint system for mounting module housings 14 within the battery pack housing 12. It is contemplated that a similar locating and restraint system can be used to secure individual cells within a module housing 14, by providing one of pins or slots on the outer surface of the cell housings, and the other of pins or slots on the interior surface of the module housing 14.

Selective illustrative embodiments of the battery pack are described above in some detail. It should be understood that only structures considered necessary for clarifying the battery pack have been described herein. Other conventional structures, and those of ancillary and auxiliary components of the battery pack, are assumed to be known and understood by those skilled in the art. Moreover, while working examples of the battery pack have described above, the battery pack is not limited to the working examples described above, but various design alterations may be carried out without departing from the device as set forth in the claims.

What is claimed, is:

1. A battery pack comprising a battery pack housing and a battery module disposed in the battery pack housing,
the battery pack housing including
a first side,
a second side that is parallel to the first side, an inner surface of the first side facing and being spaced apart from an inner surface of the second side,
a first rail that protrudes from the inner surface of the first side, and a second rail that protrudes from an inner surface of the second side,
the first rail including
a first support surface that is parallel to and spaced apart from the inner surface of the first side,
adjoining side surfaces of the first rail that extend between the inner surface of the first side and the first support surface, the first support surface and the adjoining side surfaces of the first rail providing an outer surface of the first rail, and
a first slot that opens at the first support surface and faces the inner surface of the second side, the first slot intersecting each of the first support surface and the adjoining side surfaces of the first rail, the second rail including
- a second support surface that is parallel to and spaced apart from the inner surface of the second side,
- adjoining side surfaces of the second rail that extend between the inner surface of the second side and the second support surface, the second support surface and the adjoining side surfaces of the second rail providing an outer surface of the second rail, and
- a second slot that opens at the second support surface and faces the inner surface of the first side, the second slot intersecting each of the second support surface and the adjoining side surfaces of the second rail, wherein
the battery module is disposed in the battery pack housing so as to reside between the first side and the second side, the battery module including
- a module housing, an outer surface of the module housing including a first protrusion and a second protrusion, and
- electrochemical cells disposed within the module housing, and wherein
the first protrusion is disposed in the first slot,
the second protrusion is disposed in the second slot, and
the module housing is located and retained relative to the battery pack housing via engagement of the first slot with the first protrusion, and engagement of the second slot with the second protrusion.

2. The battery pack of claim 1, wherein the first slot and the second slot are aligned in a direction perpendicular to the inner surface of the first side.

3. The battery pack of claim 1, wherein the first slot and the second slot are shaped to conform to the shape of an outer surface of the first protrusion and the second protrusion.

4. The battery pack of claim 1, wherein the first slot includes a seat portion and a chamfered guide portion that is disposed between the seat portion and the first support surface.

5. The battery pack of claim 4, wherein the guide portion is chamfered so as to have a maximum spacing between facing slot surfaces at a location corresponding the intersection of the guide portion and the first support surface, and a minimum spacing between facing slot surfaces at a location corresponding to the intersection of the guide portion and the seat portion.

6. The battery pack of claim 5, wherein the seating portion is shaped to conform to the shape of an outer surface of the fit protrusion.

7. The battery pack of claim 1, wherein the module housing includes a module first side that is transverse to the battery pack housing first side, and a module second side opposed to the module first side, and the first protrusion is formed on the module first side and the second protrusion is formed on the module second side.

8. The battery pack of claim 1, wherein the battery pack housing first side includes plural parallel and spaced apart first rails, each first rail including a first slot, and the battery pack housing second side includes plural second rails, each second rail aligned with one of said first rails.

9. The battery pack of claim 1, wherein the battery pack housing includes a detachable cover that includes the first side, and a container portion that includes the second side, and the cover is configured to be supported on the container portion to form a hollow container.

10. The battery pack of claim 1, wherein the battery pack housing includes
- a third rail that protrudes from the inner surface of the first side and is spaced apart from the first rail,
- a fourth rail that protrudes from the inner surface of the second side and is spaced apart from the second rail, wherein the module housing is disposed between the first rail and the third rail, and between the second rail and the fourth rail.

* * * * *

UNITED STATES PATENT AND TRADEMARK OFFICE
CERTIFICATE OF CORRECTION

PATENT NO. : 10,170,739 B2
APPLICATION NO. : 14/924053
DATED : January 1, 2019
INVENTOR(S) : Schoenherr et al.

Page 1 of 1

It is certified that error appears in the above-identified patent and that said Letters Patent is hereby corrected as shown below:

In the Claims

In Column 10, Lines 12-14, Lines 1-3 of Claim 6 should read:
6. The battery pack of claim 5, wherein the seating portion
is shaped to conform to the shape of an outer surface of the
first protrusion.

Signed and Sealed this
Fourth Day of June, 2019

Andrei Iancu
*Director of the United States Patent and Trademark Office*